US008839283B2

(12) United States Patent
Fellenstein et al.

(10) Patent No.: US 8,839,283 B2
(45) Date of Patent: Sep. 16, 2014

(54) BLOCKING TELEVISION COMMERCIALS AND PROVIDING AN ARCHIVE INTERROGATION PROGRAM

(71) Applicant: International Business Machines Corporation, Armonk, NY (US)

(72) Inventors: Craig W. Fellenstein, Shelton, CT (US); Rick A. Hamilton, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/745,977

(22) Filed: Jan. 21, 2013

(65) Prior Publication Data

US 2013/0132992 A1    May 23, 2013

Related U.S. Application Data

(63) Continuation of application No. 12/253,818, filed on Oct. 17, 2008, now Pat. No. 8,359,613, which is a continuation of application No. 10/205,550, filed on Jul. 25, 2002, now Pat. No. 7,454,772.

(51) Int. Cl.
*H04N 7/16* (2011.01)

(52) U.S. Cl.
USPC .............. 725/25; 725/32; 725/39; 725/46; 725/119; 725/141; 725/153

(58) Field of Classification Search
USPC .............. 725/25, 32, 39, 46, 119, 141, 153
See application file for complete search history.

(56) References Cited

U.S. PATENT DOCUMENTS

| | | |
|---|---|---|
| 5,481,296 A | 1/1996 | Cragun et al. |
| 5,703,655 A | 12/1997 | Corey et al. |
| 5,754,939 A | 5/1998 | Herz et al. |
| 5,859,662 A | 1/1999 | Cragun et al. |
| 5,949,476 A | 9/1999 | Pocock et al. |
| 5,973,723 A | 10/1999 | DeLuca |
| 6,005,561 A | 12/1999 | Hawkins et al. |
| 6,141,678 A | 10/2000 | Britt, Jr. |
| 6,144,376 A | 11/2000 | Connelly |
| 6,215,526 B1 | 4/2001 | Barton et al. |
| 6,266,094 B1 | 7/2001 | Taylor, Jr. |
| 6,298,482 B1 | 10/2001 | Seidman et al. |
| 6,370,543 B2 | 4/2002 | Hoffert et al. |
| 6,577,346 B1 * | 6/2003 | Perlman ........................ 348/460 |

(Continued)

OTHER PUBLICATIONS

Final office action dated May 30, 2007 regarding U.S. Appl. No. 10/105,124, 11 pages.

(Continued)

*Primary Examiner* — Pankaj Kumar
*Assistant Examiner* — Sahar Baig
(74) *Attorney, Agent, or Firm* — Yee & Associates, P.C.; Arthur Samodovitz

(57) ABSTRACT

An apparatus and method is disclosed for blocking specific television commercials from the viewer's television based upon the characteristics of the television commercial. In the method, characteristics from a first signal containing a television commercial received at a television are determined. The characteristics may include video and/or audio characteristics, and the characteristics may define a signature. Characteristics from a second signal, also containing the television commercial, are also received and are compared to the first signature. Upon recognizing the second signal, the television commercial is blocked.

20 Claims, 6 Drawing Sheets

(56) References Cited

U.S. PATENT DOCUMENTS

| | | | |
|---|---|---|---|
| 6,581,207 | B1 | 6/2003 | Sumita et al. |
| 6,597,405 | B1 * | 7/2003 | Iggulden .................. 348/553 |
| 6,801,713 | B1 | 10/2004 | Yagawa et al. |
| 6,949,476 | B2 | 9/2005 | Fraser et al. |
| 6,983,481 | B2 | 1/2006 | Fellenstein et al. |
| 7,039,932 | B2 | 5/2006 | Eldering |
| 7,240,354 | B2 | 7/2007 | Fellenstein et al. |
| 7,421,729 | B2 | 9/2008 | Zenoni |
| 7,454,772 | B2 | 11/2008 | Fellenstein et al. |
| 7,467,398 | B2 | 12/2008 | Fellenstein et al. |
| 7,634,789 | B2 | 12/2009 | Gerba et al. |
| 7,685,620 | B2 | 3/2010 | Fellenstein et al. |
| 7,698,720 | B2 | 4/2010 | Matz |
| 7,818,764 | B2 | 10/2010 | Matz |
| 2001/0013123 | A1 | 8/2001 | Freeman et al. |
| 2002/0042923 | A1 | 4/2002 | Asmussen et al. |
| 2002/0174430 | A1 | 11/2002 | Ellis et al. |
| 2002/0184643 | A1 * | 12/2002 | Fichet ........................ 725/105 |
| 2002/0194593 | A1 | 12/2002 | Tsuchida et al. |
| 2003/0014747 | A1 | 1/2003 | Spehr |
| 2003/0044002 | A1 | 3/2003 | Yeager et al. |
| 2003/0046690 | A1 * | 3/2003 | Miller ........................... 725/36 |
| 2003/0067554 | A1 * | 4/2003 | Klarfeld et al. ............... 348/461 |
| 2003/0149975 | A1 | 8/2003 | Eldering et al. |
| 2003/0163815 | A1 | 8/2003 | Begeja et al. |
| 2003/0172378 | A1 | 9/2003 | Lalitha et al. |
| 2003/0192045 | A1 | 10/2003 | Fellenstein et al. |
| 2003/0229893 | A1 | 12/2003 | Sgaraglino |
| 2009/0031337 | A1 | 1/2009 | Fallenstein et al. |

OTHER PUBLICATIONS

Non-final office action dated Dec. 12, 2006 regarding U.S. Appl. No. 10/105,124, 11 pages.
Non-final office action dated Feb. 21, 2008 regarding U.S. Appl. No. 10/105,124, 16 pages.
Notice of allowance dated Jul. 28, 2008 regarding U.S. Appl. No. 10/105,124, 6 pages.
Notice of allowance dated Mar. 8, 2007 regarding U.S. Appl. No. 11/222,430, 9 pages.
Notice of allowance dated Aug. 10, 2005 regarding U.S. Appl. No. 10/205,538, 6 pages.
Final office action dated Jun. 22, 2007 regarding U.S. Appl. No. 10/205,550, 22 pages.
Non-final office action dated Jan. 30, 2007 regarding U.S. Appl. No. 10/205,550, 26 pages.
Non-final office action dated Dec. 17, 2007 regarding U.S. Appl. No. 10/205,550, 21 pages.
Notice of allowance dated Jul. 9, 2008 regarding U.S. Appl. No. 10/205,550, 8 pages.
Final office action dated May 13, 2008 regarding U.S. Appl. No. 10/116,613, 12 pages.
Final office action dated Jul. 13, 2007 regarding U.S. Appl. No. 10/116,613, 11 pages.
Non-final office action dated Jan. 22, 2007 regarding U.S. Appl. No. 10/116,613, 10 pages.
Non-final office action dated Nov. 1, 2007 regarding U.S. Appl. No. 10/116,613, 12 pages.
Non-final office action dated Sep. 29, 2008 regarding U.S. Appl. No. 10/116,613, 13 pages.
Notice of allowance dated Apr. 21, 2009 regarding U.S. Appl. No. 10/116,613, 6 pages.
Final office action dated Mar. 18, 2011 regarding U.S. Appl. No. 12/253,818, 9 pages.
Non-final office action dated Nov. 15, 2011 regarding U.S. Appl. No. 12/253,818, 10 pages.
Non-final office action dated Sep. 17, 2010 regarding U.S. Appl. No. 12/253,818, 28 pages.
Non-final office action dated Sep. 17, 2012 regarding U.S. Appl. No. 12/253,818, 8 pages.
Notice of allowance dated Nov. 4, 2009 regarding U.S. Appl. No. 12/260,939, 9 pages.

* cited by examiner

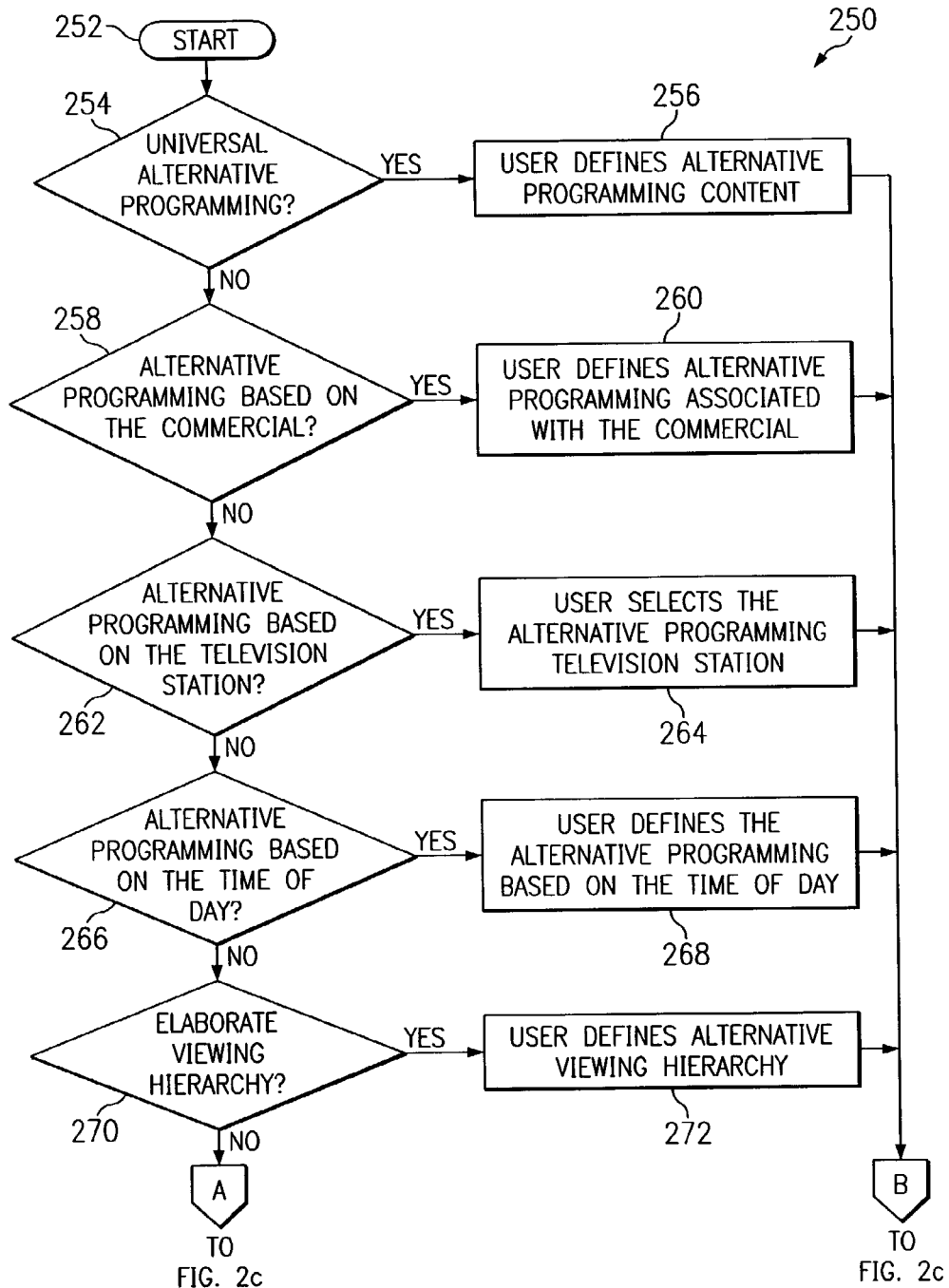

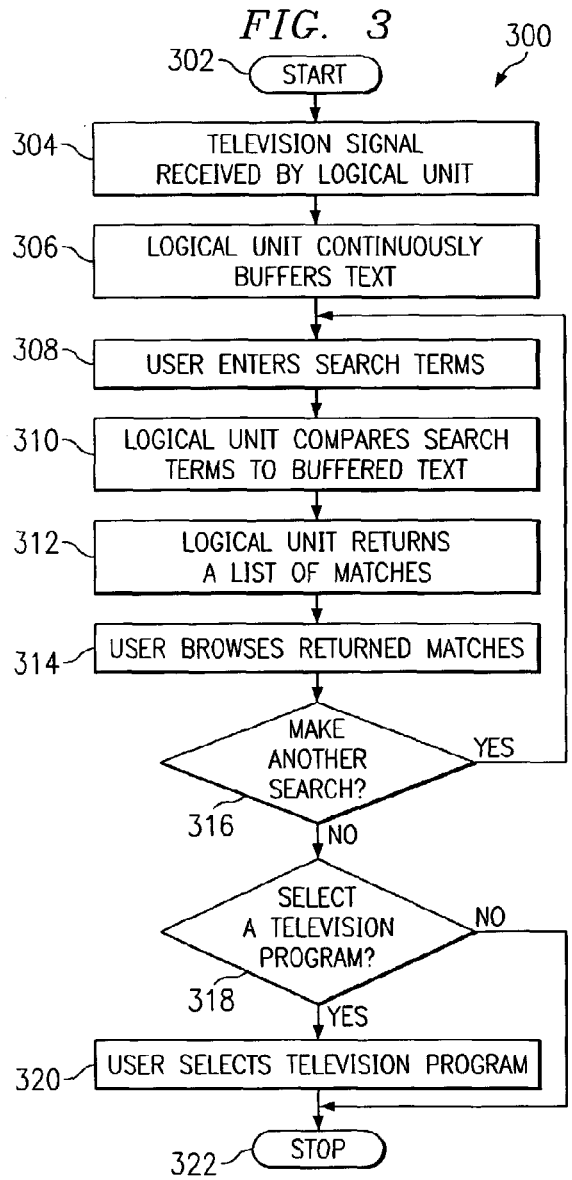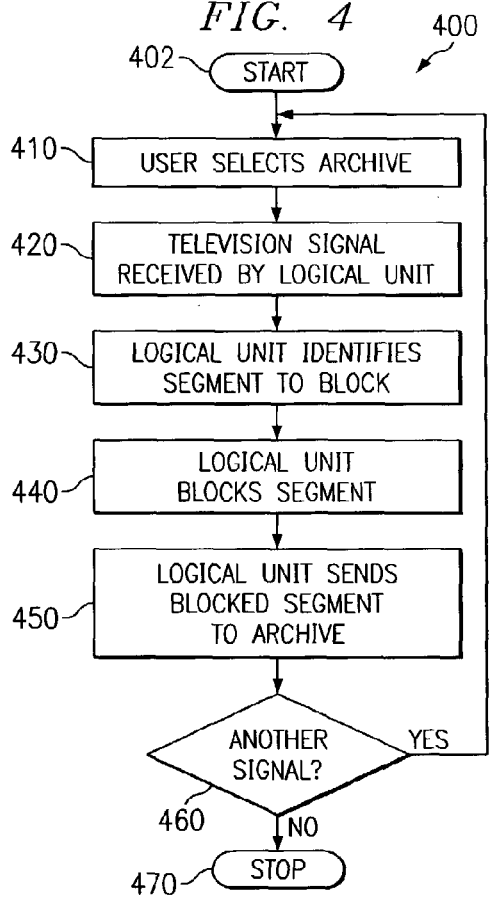

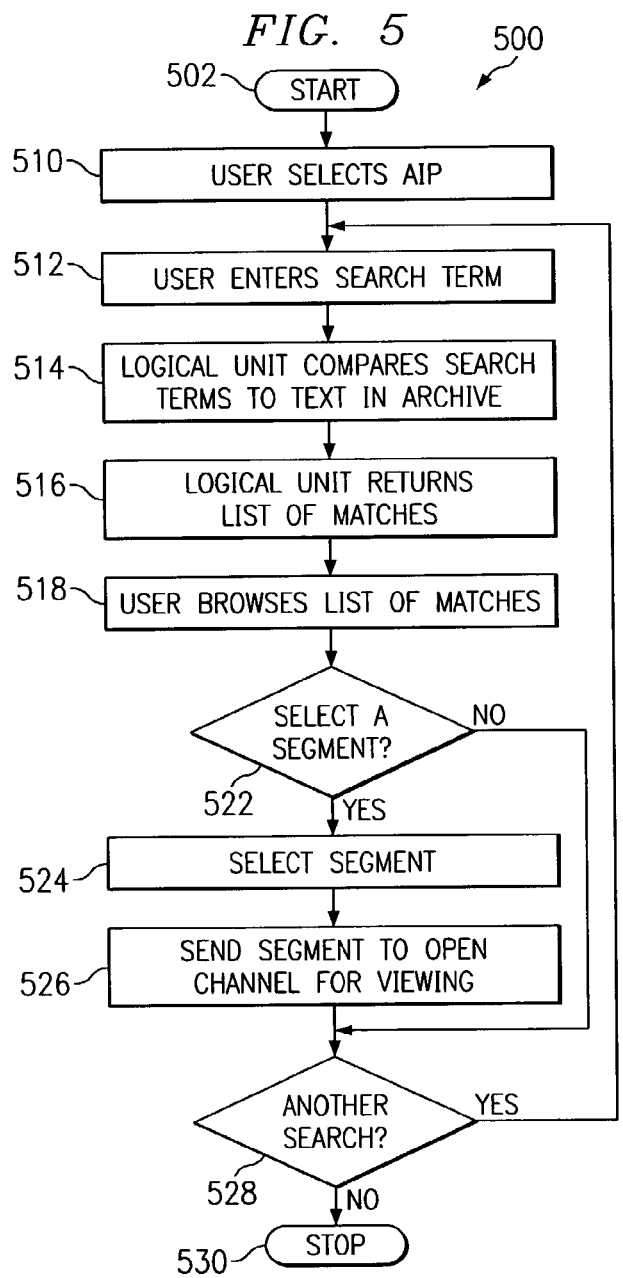

BLOCKING TELEVISION COMMERCIALS AND PROVIDING AN ARCHIVE INTERROGATION PROGRAM

This application is a continuation of U.S. patent Ser. No. 12/253,818, filed Oct. 17, 2008, U.S. Pat. No. 8,359,613, patented on Dec. 29, 2012, which is a continuation of U.S. patent Ser. No. 10/205,550, filed on Jul. 25, 2002, U.S. Pat. No. 7,454,772, patented on Nov. 18, 2008.

RELATED APPLICATIONS

This application is related to application Ser. No. 10/105,124, "Apparatus and Method of Searching for Desired Television Content," application Ser. No. 10/116,613, "Apparatus and Method for Blocking Television Commercials and Displaying Alternative Programming," and to Ser. No. 10/205,538, "Apparatus and Method for Blocking Television Commercials and Displaying Micro-Programming Content."

FIELD OF THE INVENTION

The present invention relates to an apparatus and method for blocking undesired television commercials and providing a program for detecting and blocking the play at a television of repeated television commercials.

BACKGROUND OF THE INVENTION

Debates today rage about both the delivery and funding of informational content in all of its forms. On the Internet, many content providers are moving away from their advertisement-based business models and moving towards subscription-based business models. Despite rapid advances in technology, the delivery mechanisms and methods of generating revenue for content delivered through television broadcasts have been relatively stagnant, when compared to the delivery mechanisms and methods of generating revenue for the Internet and web delivery systems. In television broadcasts, advertisers still attempt to reach users using the same techniques that they have used for decades which are the thirty and sixty second commercials interspaced throughout specific television programs. In addition to technology, the viewer is becoming increasingly sophisticated and is demanding that every second of their time, whether engaged in work or leisure pursuits, be well spent. For the vast majority of television viewers, time engaged in viewing undesired advertisements is not considered time well spent. Therefore, a need exists for an apparatus and method of preventing a television viewer from viewing unwanted commercials.

Additionally, television viewers generally do not prefer to have periods of interrupted programming or "dead air" when they are viewing a program. It would be preferable if the blocked commercial could be replaced with user-defined alternative programming.

Application Ser. No. 10/116,613, "Apparatus and Method for Blocking Television Commercials and Displaying Alternative Programming" disclosed a logical unit and a commercial blocking program in the logical unit to allow alternative viewing options so that the user may define the alternative programming to replace the unwanted communication. The commercial blocking program breaks all incoming television signals into time, video and audio components and is able to recognize specific commercials based on those components. Upon viewing an unwanted commercial, the user indicates that he wants to block the commercial through one of a variety of input methods. The commercial blocking program then prevents the commercial from being displayed on the user's television and causes alternative programming to be displayed instead. The user may configure the alternative programming via the alternative programming logic. The user may configure the alternative programming as a universal television channel, based on the specific commercial, based on the television station, based on the time of day, or based on an elaborate viewing hierarchy. At the end of the blocked commercial, the commercial blocking program displays the television program that was originally displayed on the user's television. Alternatively, the commercial blocking program can buffer the various television programs received from the cable provider and record segments of the cable signal based on certain keywords. The commercial blocking program searches for user defined keywords, records television programs complying with the search terms, and displays the recorded television programming stored in the memory.

Application Ser. No. 10/105,124, "Apparatus and Method of Searching for Desired Television Content, disclosed an apparatus and method for allowing a user to search for specific content across many television channels in order to locate desirable television shows related to the searched content. Multiplexed cable signals flow thorough a logical unit which buffers text associated with the voice stream of each station via the pre-encoded closed-captioning signal or through the real-time voice translation within the logical unit. The user then enters search terms through one of a variety of different input devices. Upon entry of the search terms, the logical unit will compare the entered term with those available keywords stored in each buffer. Lexical parsing associates terms which may differ from plural to singular forms or in tense. Additionally, synonym comparisons may be made. The logical unit will return a list of matches for the search criteria and allows the user the option of going directly to the television program. The logical unit also evaluates each returned item for its relevancy to the keywords. When not in use, the logical unit maintains a quiescent but monitoring state permitting continuous creation of lexical buffers. This permits the user who turns the television on to immediately have such search terms available. Alternatively, the logic is implemented at the cable provider and enabled through interactive links to the home. In that case, the home logical unit is unnecessary.

What is needed is an archive of blocked television commercials and an application of the television content searching engine to the archive of blocked television commercials so that a user may access an archive of blocked commercials based upon a user search criteria.

SUMMARY OF THE INVENTION

The present invention, which meets the needs stated above, is an apparatus and method for blocking specific television commercials from the viewer's television based upon the characteristics of the television commercial and a program to place the blocked television commercials into an archive. An archive interrogation program then acquires the users search criteria and sends the search criteria to the content search program for a list of matches. The matches are displayed to the user and the user can select a segment for viewing.

BRIEF DESCRIPTION OF THE DRAWINGS

FIG. 2B is a flowchart of the commercial blocking program.

FIG. 3 is a flowchart of the search program.

FIG. 4 is a flowchart of the archive program.

FIG. 5 is a flowchart of the archive interrogation program.

DETAILED DESCRIPTION OF THE PREFERRED EMBODIMENT

Figure 1:
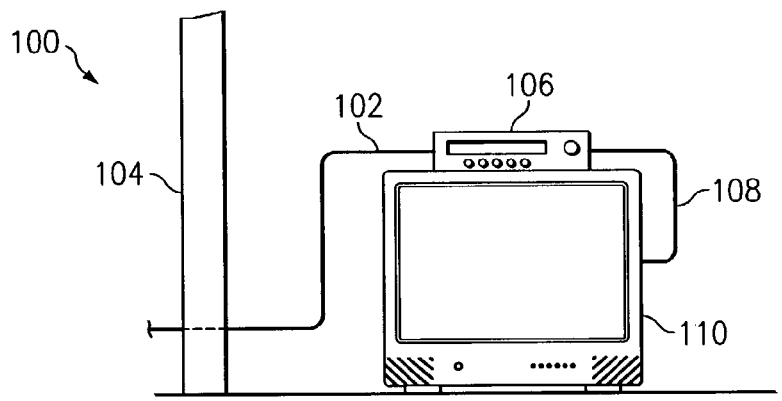
FIG. 1 is an illustration of the invention interacting with a cable provider and a television.

The terms below are defined for all uses herein as follows:

"Alternate viewing" means content displayed in place of a blocked commercial and may include one or more of the following: (1) a brief message displayed to inform the viewer that alternative programming will be presented during the commercial interval; (2) an on-screen counter, showing how many seconds are left before the planned return to primary viewing; and (3) directions to the tuner to go to a particular station. The directions to the tuner may be universal, by commercial, by originating station, by time of day, by definition of an elaborate viewing hierarchy, or to a micro-programming station or to buffered microprogramming.

"Alternate viewing provider" means an entity that offers micro-programming to a user for display in conjunction with a logical unit.

"Archive" means a copy of one or blocked commercials that are saved for future reference or research.

"Buffered" means an alternate viewing package stored in the memory of a logical unit or at the cable service provider so that synchronization problems between the "switchover" point and the alternate programming delivery do not occur. In other words, when a request for alternative programming is made, the logical unit can draw from a buffered alternate viewing package so that the user does not risk joining the alternate viewing package in progress.

"Buffering" means a process of examining the closed captioning text or audio signal associated with television signals and configuring the examined signal such that it may be searched for specific keywords.

"By commercial" means using content from a particular station to replace the specifically identified commercial.

"By originating station" means using the original station to determine the alternative content which will replace all blocked commercials.

"By time of day" means using the time of day to determine which station to use as alternative content for all blocked commercials.

"Cable provider" means a company which provides television service to multiple users and includes satellite television providers.

"Component signature" is a group of variables, based on a time component, an X video component, a Y video component, and an audio component, that is used to identify a commercial from all other commercials when a "unique digital identifying tag is not available.

"Cumulative digital signature" means the aggregation of one or more selected characteristics of a data sequence to provide a unique number for identification of the complete data sequence.

"Elaborate viewing hierarchy" means a combination of a plurality of universal, by commercial, by originating station, or by time or day alternative viewing formats.

"Lexical parsing" as used herein means a process of finding matches to a desired search term by comparing the desired search term letter-by-letter with the terms in an available database.

"Micro-programming," means one or more "alternate viewing packages" that each contain a complete information exchange or an entertainment package in a segment of time that is adapted to fit into the time available from one or more commercials blocked by a logical unit. For example, an alternate viewing package could contain news headlines, weather updates, sports updates, or very short live action or animated shorts that are designed to entertain the user in a crisp, concise segment. An alternate viewing package would normally be thirty or sixty seconds in length but could be designed for any length of time that a logical unit could make available.

"Multiplex" means the process of funneling several different streams of data over a common communications line.

"Staggered time alternate viewing package" means an alternate viewing package broadcast on start times that are staggered for a number of seconds to coincide with the time slots of blocked commercials. For example, an alternate viewing package may start at the top and bottom of the minute on a given station, and at 15 and 45 seconds on another station. Accordingly, the station with the alternate viewing package start time closest to the start time of the blocked commercial would be chosen.

"Time synchronized" means an alternate viewing package, delivered on demand in which the user joins the broadcast at the exact start point of the micro-program.

"Unique digital identifying tag" means a number sequence before the header and after the trailer of each commercial. The number sequence is assigned according to an industry standard that allows each commercial to be identified from every other commercial.

"Universal" means using content from a particular station to replace all blocked commercials.

FIG. 1 is an illustration of the invention 100 interacting with a cable provider and a television set. The depiction of the cable provider is by way of illustration only and is not intended to limit the scope of the invention. Persons skilled in the art will recognize that the invention may be used with either a cable or wireless data transmission system. The cable provider (not shown) provides a television signal through a coaxial cable 102 that runs through the user's wall 104 and into logical unit 106. Logical unit 106 analyzes the cable signal as described below and displays the information on television 110 via television connection 108. Logical unit 106 can optionally be combined with television 110. Alternatively, logical unit 106 may be placed at the same location as the cable provider such that it is unnecessary to have logical unit 106 at the user's location.

Figure 2A:
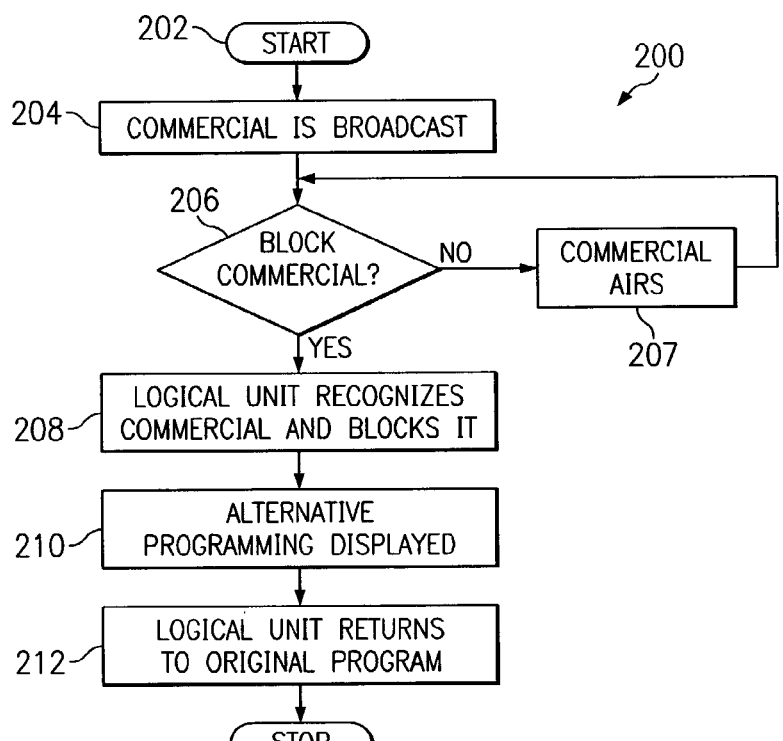
FIG. 2A is a flowchart of the commercial blocking program.

FIG. 2A is a flowchart of commercial blocking program 200 which operates inside logical unit 106. Commercial blocking program 200 starts (202) whenever multiplexed cable signals are broadcast (204). In the preferred embodiment, each commercial has a unique digital identifying tag, similar to a serial number, which identifies a particular commercial. Logical unit 106 recognizes a particular commercial based on the unique identifying tag.

In an alternate embodiment, logical unit 106 identifies commercials by a "component signature." Multiplexed cable signals are defined by four components: a time component, an X video component, a Y video component, and an audio component. Every television program and/or commercial can be readily identified by these components. There is generally allowed some amount of time skew in the synchronization of the four components to identify the absolute beginning of a program or commercial. By taking the time skew into consideration, commercial blocking program 200 can identify a particular commercial. For example, a given pattern of video/audio signals occurring at a time "delta" (perhaps but not necessarily in the order of 500 microseconds) around the nominal beginning of an advertisement, may point back to a specified commercial.

Alternatively, logical unit 106 establishes an "overall digital signature" for a particular commercial. In this event, the signal need not be dissembled into its video/audio components as in the "component signature," but rather, analysis of cumulative digital characteristics may be used to identify the commercial to be blocked. One or more characteristics of a data sequence is selected and aggregated to provide a unique number for identification purposes of the complete data sequence. The advantage of using cumulative digital characteristics is that all commercials could be blocked using this technique. In the case of commercials to be identified by an "overall digital signature," the logical unit develops a library at the set-top of the "overall digital signature" of the blocked advertisements. For example, it may be assumed that some time interval, "Tsample" is great enough to ascertain with accuracies approaching one hundred percent the identity of a given advertisement. "Tsample" may be a sub-second or it may be multi-second, depending on the processing power behind the logical unit and the uniqueness of the commercial. Once a commercial signal is detected to be identical to a blocked advertisement, then the logical unit takes the actions it has been programmed to implement.

Figure 6:
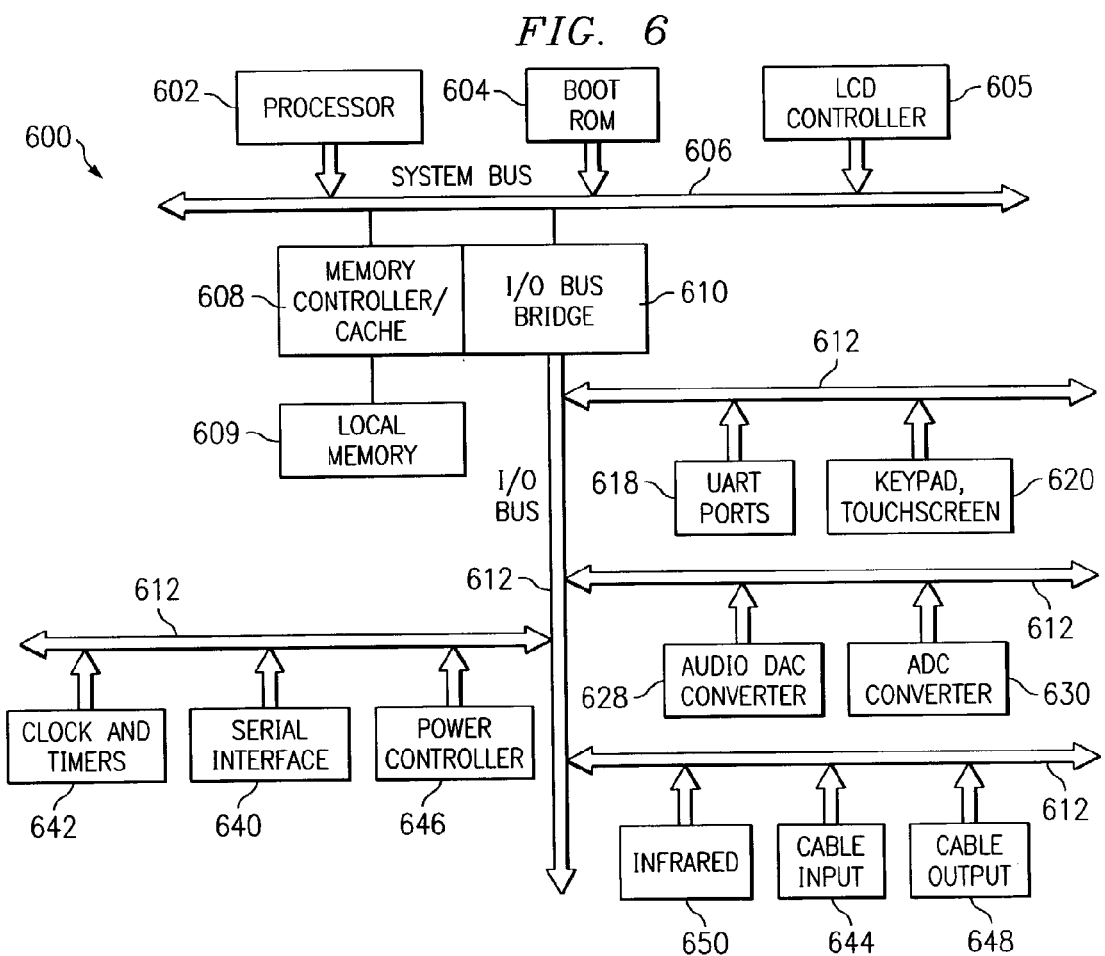
FIG. 6 is a depiction of the data processing system contained within the logical unit.

As a commercial airs, the user has the option of blocking the commercial (206) by means of commercial blocking program 200 located in the local memory 209 of logical unit 106 (See FIGS. 1 and 6). If the user chooses not to block the commercial, then commercial blocking program 200 allows the commercial to air (207) and returns to step 206. If at step 206 the user chooses to block the commercial, then the logical unit will block the commercial (208). In blocking the commercial, the logical unit prevents the specific commercial from displaying on the user's television and displays alternative content instead (210). After commercial blocking program 200 has displayed the alternative programming, the original programming of the original television channel is displayed (212) and commercial blocking program 200 ends (214).

Figure 2C:
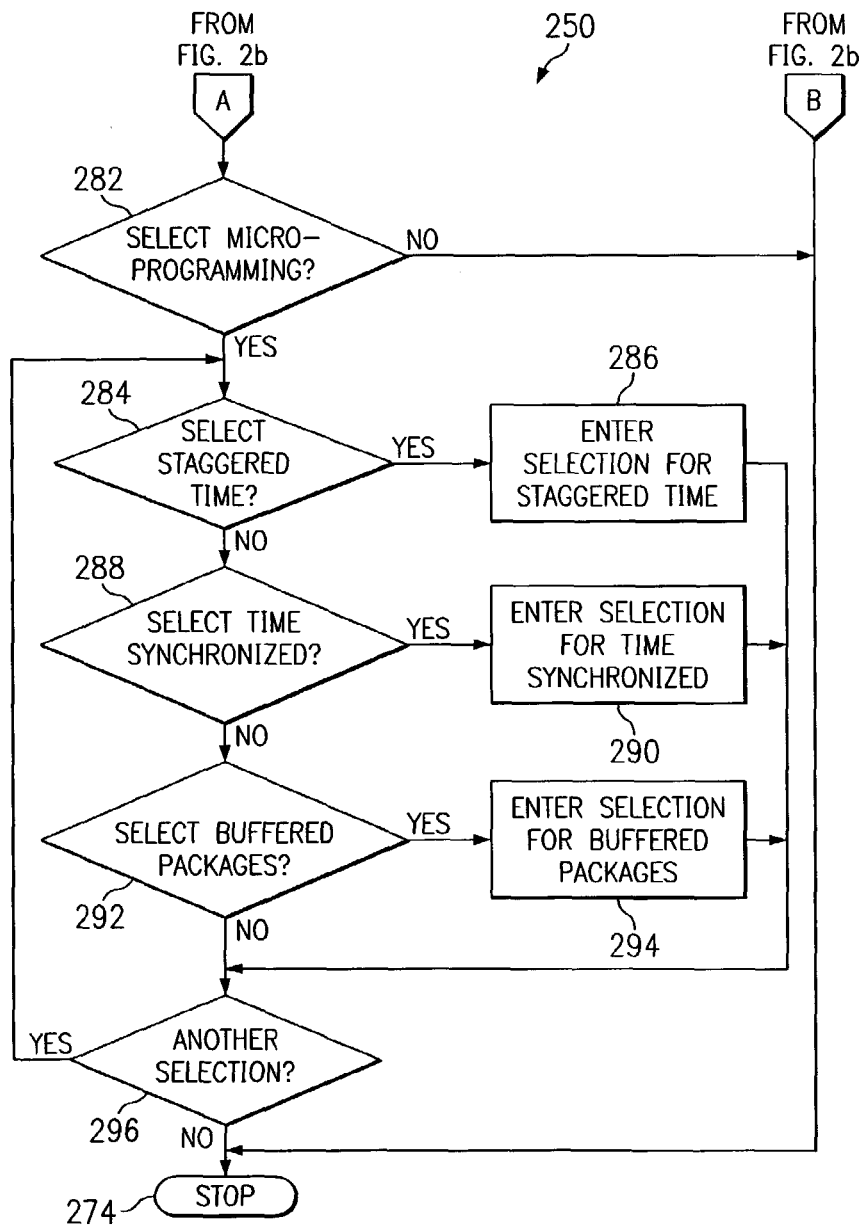
FIG. 2C is a flowchart of the commercial blocking program.

There are many different types of alternative programming that commercial blocking program 200 can display on the user's television instead of the blocked commercial. In one embodiment, commercial blocking program 200 can display a blank screen for the duration of the blocked commercial. However, in the preferred embodiment, commercial blocking program 200 displays the programming according to alternative programming logic 250 in FIGS. 2B and 2C. Alternative programming logic 250 starts (252) and queries the user if he or she would like to define the alternative programming as a universal television channel that will replace all blocked television commercials (254). A universal television channel is one which will display the contents of a specific television channel on the user's television whenever the blocked commercial airs. For example, whenever a blocked commercial airs, commercial blocking program 200 will cause the The Weather Channel to be displayed. A universal television channel may include Web TV or any programming variation that may be made available to the user of the television to which the logical unit is connected. If the user determines that they would like to select a universal alternative channel, then the user specifies which channel is the universal television channel (256) and alternative programming logic 250 ends (294). If at step 254 the user determines that he or she would not like to select a universal television channel, then alternative programming logic 250 queries the user if he or she would like to define the alternative programming based on the blocked commercial (258). Alternative programming based on the blocked commercial will display a particular television channel whenever a specific blocked commercial airs. For example, whenever commercial X airs, commercial blocking program 200 will cause The Weather Channel to be displayed. If the user determines that he or she would like to define the alternative programming based on the blocked commercial, then the user selects a specific television channel that will display whenever the specific television commercial airs (260) and alternative programming logic 250 ends (298). If the user determines at step 258 that he or she do not want to define the alternative programming based on the commercial, alternative programming logic 250 queries the user whether he or she would like to define alternative programming based on the television channel (262). Alternative programming based on the television channel will display television content based on a preferred television channel and a contingent television channel when the blocked commercial airs. For example, whenever a blocked commercial airs, The Weather Channel will be displayed, and in the event The Weather Channel is already being displayed, then CNN will be displayed. If the user determines that he or she would like to define the alternative programming based on the television channel, then the user defines the preferred and contingent television channels (264) and alternative programming logic 250 ends (298). If at step 262 the user determines that he or she does not want to define alternative programming based on the television channel, then alternative programming logic 250 queries the user whether he or she would like to define alternative programming based on the time of day (266). Alternative programming based on the time of day displays a specific television channel depending on the time of the blocked commercial. For example, if the blocked commercial airs before noon, The Weather Channel will be displayed, and if the blocked commercial airs after noon, CNN will be displayed. If the user would like to define the alternative programming based on the time of day, then the user defines the alternative television channels and the time associated with each alternate channel (268) and alternative programming logic 250 ends (298). If at step 266 the user determines that he or she does not want to define the alternative programming based on the time of day, alternative programming logic 250 queries the user whether he or she would like to define alternative programming based on an elaborate viewing hierarchy (270).

An elaborate viewing hierarchy is a combination of the alternative programming determinations in steps 254, 258, 262, and 266. There are numerous possible combinations of the programming determinations that will create elaborate viewing hierarchies. For example, one possible elaborate viewing hierarchy would be "whenever a blocked commercial airs, display The Weather Channel; however, if there is also a blocked commercial on The Weather Channel, then go to CNN before noon and CNBC after noon." The elaborate viewing hierarchy may offer the user the option to "mix and match" various combinations of blocked and unblocked signals. For example, the user may select a split screen option where the blocked commercial appears in a portion of the screen while alternate programming appears in the remaining portion of the screen. The user may select an option that will display alternative programming while also displaying the close captioned text of the blocked commercial. Further in the alternative, the user may elect to have more than one alternate programming option displayed. For example, the user may elect to have a split screen display CNN on one portion of the screen and the Weather Channel on the other portion of the screen. If the user would like to define an elaborate viewing hierarchy, then the user enters the appropriate information (i.e. time, channel, and commercial) to define the hierarchy (272) and alternative programming logic 250 ends (298). If at step 270 the user determines that he or she would not like to define an alternative viewing hierarchy, alternative programming logic 250 goes to step 282 (See FIG. 2C).

Next a determination is made as to whether the user wants to select micro-programming (282). If the user does not want to select micro-programming, alternate programming logic 250 ends (298). If at step 282 the user determines that he or she wants to select microprogramming, a determination is made as to whether staggered time alternate viewing packages are desired (284). If staggered time alternate viewing packages are desired, then the selection is entered (286) and alternate programming logic 250 goes to step 296. If staggered time alternate viewing packages are not selected, then a determination is made as to whether the user wants to select time synchronized alternate viewing packages (288). If the user desires to selected time synchronized alternate viewing packages, then the selection is entered (290) and alternate programming logic 250 goes to step 296. If the user does not select time synchronized alternate viewing packages, then a determination is made as to whether a buffered alternate viewing package is desired (292). If a buffered alternate viewing package is desired, then the selection is entered (294). If a buffered alternate viewing package is not desired, then a determination is made as to whether another selection is made (296). If another selection is to be made, alternate programming logic 250 goes to step 284. If another selection is not to be made, alternate programming logic 250 ends (298). A default option may also be available if the alternate viewing service provider plays continuously broadcast alternate viewing packages. In that case the default option would be that the television would move to the alternate viewing broadcast at the time of the blocked commercial and pick up the alternate viewing package playing at that time.

In an alternative embodiment of alternative programming logic 250, a negative determination at step 296 would send the user back to step 254 so that the options may be viewed again. Additionally, there are other types of alternative programming which may be displayed at step 210. The user can then enter search criteria and search program 200 will record the television signal based on the specific time, channel, and/or keywords. For example, whenever "and now your local forecast" is found in the audio component of the cable signal for The Weather Channel, logical unit 106 can record the accompanying local forecast. Additionally, logical unit 106 can be set to record a specific show. For example, logical unit 106 could be set to record the 11 a.m. Sports Center on ESPN. In either case, the recorded programming can be displayed in place of the blocked commercial.

FIG. 3 is a flowchart of the search program contained within logical unit 106 of the present invention. Search program 300 starts (302) and logical unit 106 receives the cable signal transmitted by the cable provider (304). The cable signal is multiplexed and comprises at least a visual signal, an audio signal, and a closed caption text signal. Moreover, the multiplexed cable signal is not limited to real-time cable programming. The multiplexed signal may also contain information regarding past and future television programs. As logical unit 106 receives the signal, search program 300 continuously buffers the transmitted multiplexed cable signal (306). In buffering the signal, search program 300 obtains the closed-caption text from the cable signal and store the words contained in the captioning text along with the television channel number and time of the television program. Alternatively, search program 300 can buffer the television signal by analyzing the audio signal and buffering the keywords from the audio signal. The text buffering described above is known in the art. Furthermore, the buffering process is not limited to one television channel or one specific time period. If a user desires to buffer different channels at different times, then the user may do so by means of search program 300. For example, if search program 300 has ten hours of buffering time available, the user can have search program 300 buffer ten hours of a channel such as Cable Network News (CNN). Alternatively, search program 300 can buffer four hours of CBS, four hours of CNN, and two hours of the weather channel. Furthermore, the buffering times do not have to be similar. The user can define the CBS buffering time from 5 am to 9 am, the CNN buffering time from 8 am to noon, and the weather channel from 1 pm to 3 pm. Additionally, search program 300 is not limited to the English language. Search program 300 is capable of buffering television in multiple languages simultaneously. Thus, at any given time search program 300 is capable of buffering an enormous variety of television programs.

The user then enters keyword terms that represent the search criteria for search program 300 (308). The search terms can be entered via a keyboard, stylus, infrared port, or on-screen programming. In entering the search terms, search program 300 will recognize conventional Boolean search terms such as "AND", "OR", and "NOT". Search program 300 is capable of accepting wildcard search terms. For example, the wildcard search term "run*" would search for run and all possible variations such as runner, running, runners, and so on. Search program 300 also compares each of the search terms to a dictionary database. If any of the search terms are not in the dictionary database, search program 300 will determine related words using lexical parsing and query the user if the terms are relevant to the desired search. Lexical parsing solves the problem of tense variation in the search terms. Search program 300 is also capable of resolving ambiguities in entered search terms by comparing the search terms to the dictionary database. Those skilled in the art are aware of how to configure a search program to resolve ambiguities. In alternative embodiments, the query step can be removed where search program 300 automatically adds the lexically parsed words to the list of search terms. Additionally, the search criteria can comprise a date restriction (i.e. only today's programs, only programs on this week, or only programs on Tuesdays). Furthermore, the search criteria can comprise restrictions based on specific channels (i.e. only programs on ESPN, DISCOVERY, CNN, or VH1, or alternatively, only programs on channels 8, 12, 25, 45, or 54).

Search program 300 then compares the search terms to the buffered text (310). Search program 300 will compare the search terms to the terms contained within the buffer. In comparing the search terms with the buffered programs, search program 300 will also create a list of synonym search terms. By accessing a thesaurus database, search program 300 can obtain relevant synonyms and use those terms to search the buffered text as well. When the search term matches a word in the buffered text, search program 300 will mark the program and continue to search through the rest of the buffered text. When the entire buffered text has been searched, search program 300 evaluates the relevancy of each flagged item. In evaluating the relevancy of each flagged item, search program 300 looks to the original search terms, the synonyms search terms, the lexically parsed search terms, and the date, time and channel specified by the user. Search program 300 then ranks the flagged items from most relevant to least relevant.

Search program 300 then displays the list of television programs which were previously marked in step 310 (312). Search program 300 will organize the results of the search according to how well they correspond to the entered search criteria. The results of the search are displayed with the time and television channel pertaining to the television program. The user then browses the television programs returned in step 312 (314) and makes a determination whether they would like to conduct another search (316). If the user does want to conduct another search, search program 300 returns to step 308. If the user does not want to conduct another search, the user makes a determination whether they would like to select a television program (318). If the user decides to select a television program, the user selects a television program, search program 300 displays the selected television program (320), and search program 300 ends (322). If the user does not want to select a television program, then search program 300 ends (322).

FIG. 4 is a depiction of the flowchart for archive program 400. Archive program 400 begins (402) and the user selects an archive option from the logical unit (410). A television signal is received by the logical unit (420) and the logical unit identifies a segment of the signal to block (430). The logical unit blocks the identified segment (440) and sends the blocked segment to the archive (450). A determination is made as to whether or not there is another signal to be analyzed (460). If there is another signal to be analyzed archive program 400 goes to step 410. If there is not another signal to be analyzed, archive program 400 ends (470).

FIG. 5 is a depiction of the flowchart for the archive interrogation program (AIP) 500. AIP 502 begins and the user selects the AIP option from the logical unit (510). The user enters the search terms desired to locate commercials in a particular area of interest (512). The logical unit compares the search terms to text in the archived segments (514). The logical unit returns a list of matches (516). The user browses the list of matches (516). A determination is made as to whether the user wants to select a segment (522). If the user wants to select a segment, the user selects a segment from the list of matches (524). AIP 500 sends the selected segment to an open channel for viewing (526). A determination is made as to whether the user wants to conduct another search (528). If the user wants to conduct another search, the AIP 500 goes to step 512. If the user does not want to conduct another search, AIP 500 ends (530).

FIG. 6 is a depiction of the data processing system 600 contained within logical unit 106 (See FIG. 1). Data processing system 600 comprises processor 602, boot rom 604, and LCD controller 605 coupled to system bus 606. Also connected to system bus 606 is memory controller/cache 608, which provides an interface to local memory 609. I/O bus bridge 610 is connected to system bus 606 and provides an interface to I/O bus 612. Memory controller/cache 608 and I/O bus bridge 610 may be integrated as depicted. Peripheral components are connected via I/O bus 612. Typical peripheral components include Universal Asynchronous Receiver Transmitter (UART) 618, a keypad or touch screen 620, digital-to-analog converters 628, analog-to-digital converters 630, serial interface controller 640, clocks and timers 642, cable output to the television 644, power controller 646, cable input from the cable provider 648, and infrared ports 650. Those skilled in the art will appreciate the depiction of data processing system 600 in FIG. 3 is exemplary and is not intended as an architectural limitation of the present invention. Data processing system 600 may be a separate single controller.

Many optional features can be displayed along with the alternative programming. For example, it may be beneficial to display a timer in the corner of the screen which shows the time remaining until the end of the blocked commercial. Additionally, the user may desire to have a brief description of which commercial is being blocked. Moreover, the user may wish to have a timer counting down the amount of time until the desired television content returns. Furthermore, the inventive concept contained herein can be utilized to block all commercials and display only desired programming. Alternatively, the logical unit can buffer the entire multiplexed signal, delay the signal a pre-determined time (i.e. sixty seconds) and block out all television programming that is not greater than sixty seconds. This would block all thirty and sixty second television commercials. This implementation can also be orchestrated at the cable provider rather than the user's television or the logical unit. The user may have the option to block selected commercials permanently (without the recourse to unblock the commercial at a later time) while designating other commercials as non-permanently blocked commercials (with the recourse to unblock the commercial at a later time). The user may have the option to block all previously blocked commercials (and to view new commercials) or to block all commercials. In addition, the user may be provided with the option to block, unblock and access the programming of the logical unit by means of voice commands or audible signals such as clapping.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method for selectively blocking a television commercial from a first television channel rendering by a television, the method comprising the steps of:

receiving, by one or more processors from a user, an identification of a second television channel to provide audio and video content to substitute for a subsequent broadcast of the television commercial from the first television channel;

receiving, by one or more processors, a first broadcast signal from the first television channel that is currently being rendered on the television and contains the television commercial;

determining, by one or more processors from the first broadcast signal, a plurality of video and audio characteristics of the television commercial which form, at least in part, a signature for the television commercial;

receiving, by one or more processors, a second, subsequent broadcast signal from the first television channel while the television is tuned to the first television channel; and determining, by one or more processors, that the second broadcast signal contains the signature; and in response, rendering, with audio or video, current content from the second broadcast channel, wherein the television is tuned to the second broadcast channel.

2. The method according to claim 1 wherein the plurality of video and audio characteristics include an x video component, a y video component, and an audio component.

3. The method according to claim 2 further comprising:
aggregating, by one or more processors, the plurality of video and audio characteristics obtained in a time interval of a data sequence for the second broadcast signal;
determining, by one or more processors based on aggregating the plurality of characteristics, a unique identifier that identifies the data sequence; and
determining, by one or more processors, that the second broadcast signal contains the signature based on the unique identifier.

4. The method according to claim 3 further comprising assigning, by one or more processors, a first unique identifier for the plurality of characteristics obtained in a time interval of a data sequence for the first broadcast signal, and wherein determining, by one or more processors, that the second broadcast signal contains the signature includes comparing the unique identifier from the second broadcast signal to the first unique identifier.

5. The method according to claim 4, further comprising:
storing the first unique identifier in a library in a set top box for the television; and
comparing, by one or more processors, the unique identifier from the second broadcast signal with a plurality of unique identifiers in the library.

6. A computer system for selectively blocking a television commercial from a first television channel rendering by a television, the computer system comprising:
one or more processors, one or more computer-readable memories and one or more computer-readable storage devices, and program instructions, stored on at least one of the one or more storage devices for execution by at least one of the one or more processors via at least one of the one or more memories, the program instructions comprising:
program instructions to receive, from a user, an identification of a second television channel to provide audio and video content to substitute for a subsequent broadcast of the television commercial from the first television channel;
program instructions to receive a first broadcast signal from the first television channel that is currently being rendered on the television and contains the television commercial;
program instructions to determine, from the first broadcast signal, a plurality of video and audio characteristics of the television commercial which form, at least in part, a signature for the television commercial;
program instructions to receive a second, subsequent broadcast signal from the first television channel while the television is tuned to the first television channel; and
program instructions to determine that the second broadcast signal contains the signature; and in response, render, with audio or video, current content from the second broadcast channel, wherein the television is tuned to the second broadcast channel.

7. The computer system according to claim 6 wherein the plurality of video and audio characteristics include an x video component, a y video component, and an audio component.

8. The computer system according to claim 7 further comprising:
program instructions to aggregate the plurality of video and audio characteristics obtained in a time interval of a data sequence for the second broadcast signal;
program instructions to determine, based on aggregating the plurality of characteristics, a unique identifier that identifies the data sequence; and
program instructions to determine that the second broadcast signal contains the signature based on the unique identifier.

9. The computer system according to claim 8 further comprising:
program instructions, to assign a first unique identifier for the plurality of characteristics obtained in a time interval of a data sequence for the first broadcast signal, and wherein determining that the second broadcast signal contains the signature based on the unique identifier includes comparing the unique identifier from the second broadcast signal to the first unique identifier.

10. The computer system according to claim 9 further comprising:
program instructions to store the first unique identifier in a library in a set top box for the television; and
program instructions to compare the unique identifier from the second broadcast signal with a plurality of unique identifiers in the library.

11. A computer program product for selectively blocking a television commercial at a television, the computer program product comprising:
one or more computer-readable storage devices, and program instructions stored on the storage devices, the program instructions comprising:
program instructions to receive, from a user, an identification of a second television channel to provide audio and video content to substitute for a subsequent broadcast of the television commercial from the first television channel;
program instructions to receive a first broadcast signal from the first television channel that is currently being rendered on the television and contains the television commercial;
program instructions to determine, from the first broadcast signal, a plurality of video and audio characteristics of the television commercial which form, at least in part, a signature for the television commercial;
program instructions to receive a second, subsequent broadcast signal from the first television channel while the television is tuned to the first television channel; and
program instructions to determine that the second broadcast signal contains the signature; and in response, render, with audio or video, current content from the second broadcast channel, wherein the television is tuned to the second broadcast channel.

12. The computer program product according to claim 11 wherein the plurality of video and audio characteristics include an x video component, a y video component, and an audio component.

13. The computer program product according to claim 12 further comprising:
program instructions to aggregate the plurality of video and audio characteristics obtained in a time interval of a data sequence for the second broadcast signal;
program instructions to determine based on aggregating the plurality of characteristics, a unique identifier that identifies the data sequence; and
program instructions to determine that the second broadcast signal contains the signature based on the unique identifier.

14. The computer program product according to claim 13 further comprising:
program instructions to assign a first unique identifier for the plurality of characteristics obtained in a time interval of a data sequence for the first broadcast signal, and wherein determining that the second broadcast signal contains the signature based on the unique identifier includes comparing the unique identifier from the second broadcast signal to the first unique identifier.

15. The method according to claim 1, further comprising:
receiving, by one or more processors from the user, an identification of a third television channel;
receiving, by one or more processors from the user, an identification of a particular time of day; and
responsive to determining that the second broadcast signal includes the signature, rendering, with audio and video, current content from the second broadcast channel when a current time is before the particular time of day and rendering, with audio and video, current content from the third broadcast channel when the current time is after the particular time and day, wherein the television is tuned to the second broadcast channel prior to the particular time of day, and further wherein the television is tuned to the third channel after the particular time of day.

16. The method according to claim 1, further comprising:
receiving, by one or more processors from the user, an identification of a third television channel;
determining, by one or more processors, that a third broadcast signal from the second television channel contains the signature; and
rendering, with audio and video, current content from the third broadcast channel.

17. The computer system according to claim 6, further comprising:
program instructions to receive, from the user, an identification of a third television channel;
program instructions to receive, from the user, an identification of a particular time of day; and
program instructions, responsive to determining that the second broadcast signal includes the signature, to render, with audio and video, current content from the second broadcast channel when a current time is before the particular time of day and render, with audio and video, current content from the third broadcast channel when the current time is after the particular time and day, wherein the television is tuned to the second broadcast channel prior to the particular time of day, and further wherein the television is tuned to the third channel after the particular time of day.

18. The computer system according to claim 6, further comprising:
program instructions to receive, from the user, an identification of a third television channel;
program instructions to determine that a third broadcast signal from the second television channel contains the signature; and
program instructions to render, with audio and video, current content from the third broadcast channel.

19. The method according to claim 1, further comprising:
determining, by one or more processors, that the second broadcast signal no longer contains the television commercial; and in response, rendering, with audio or video, current content from the first broadcast channel, wherein the television is tuned to the first broadcast channel.

20. The computer system according to claim 6, further comprising:
program instructions to determine that the second broadcast signal no longer contains the television commercial; and in response, render, with audio or video, current content from the first broadcast channel, wherein the television is tuned to the first broadcast channel.

* * * * *